United States Patent [19]

Takahashi

[11] Patent Number: 5,097,435
[45] Date of Patent: Mar. 17, 1992

[54] HIGH SPEED DIVIDING APPARATUS

[75] Inventor: Masafumi Takahashi, Yokohama, Japan

[73] Assignee: Kabushiki Kaisha Toshiba, Kawasaki, Japan

[21] Appl. No.: 455,236

[22] Filed: Dec. 22, 1989

[30] Foreign Application Priority Data

Dec. 24, 1988 [JP] Japan .................................. 63-326451
Feb. 23, 1989 [JP] Japan ...................................... 1-41566

[51] Int. Cl.$^5$ .............................................. G06F 7/52
[52] U.S. Cl. .................................................. 364/766
[58] Field of Search ...................... 364/764, 766, 767

[56] References Cited

U.S. PATENT DOCUMENTS 4,272,827 6/1981 Inui et al. .............................. 364/764
4,872,214 10/1989 Zurawski ............................. 364/766
4,891,780 1/1990 Miyoshi ................................ 364/766

OTHER PUBLICATIONS

IEEE Transaction Computers, vol. 17, No. 10, Oct. 1968, "Higher Estimates of the Divisor and Partial Reminders"; Atkins, D. E.; 1968.

Primary Examiner—Gary V. Harkcom
Assistant Examiner—Long T. Nguyen
Attorney, Agent, or Firm—Oblon, Spivak, McClelland, Maier & Neustadt

[57] ABSTRACT

An operation apparatus and method receive a dividend and a divisor as the input values of a divide operation processing, repeat a subtractive operation when the dividend and divisor are determined as being equal in sign to each other, and progress the repetition of an additive operation when the dividend and divisor are determined as being different in sign from each other. When the most significant bit of a quotient is calculated as having a negative number upon the sign equality of the dividend and divisor and when the most significant bit of the quotient is calculated as having a negative number upon the sign inequality of the dividend and divisor, an overflow is repeated at a time the other quotient bit conincides with the most significant bit of the quotient to detect it during a portion of the operation process.

18 Claims, 10 Drawing Sheets

ALZERO FLAG = 0, RESULT ≠ 0

| | SIGN OF DIVIDEND | SIGN OF DIVISOR | SIGN OF DIVISOR AFTER COMPLEMENT | CARRY | QUOTIENT BIT |
|---|---|---|---|---|---|
| a | 0 | 0 | 1 | 0 | 0 |
| | | | | 1 | 1 |
| b | 0 | 1 | 1 | 0 | 0 |
| | | | | 1 | 1 |
| c | 1 | 0 | 0 | 0 | 1 |
| | | | | 1 | 0 |
| d | 1 | 1 | 0 | 0 | 1 |
| | | | | 1 | 0 |

FIG. 3A

ALZERO FLAG = 0, RESULT ≠ 0

| | SIGN OF DIVIDEND | SIGN OF DIVISOR | SIGN OF DIVISOR AFTER COMPLEMENT | BORROW | QUOTIENT BIT |
|---|---|---|---|---|---|
| a | 0 | 0 | 0 | 0 | 1 |
| | | | | 1 | 0 |
| b | 0 | 1 | 0 | 0 | 1 |
| | | | | 1 | 0 |
| c | 1 | 0 | 1 | 0 | 0 |
| | | | | 1 | 1 |
| d | 1 | 1 | 1 | 0 | 0 |
| | | | | 1 | 1 |

HIGH SPEED DIVIDING APPARATUS

BACKGROUND OF THE INVENTION

1. Field of the Invention

The present invention relates to an operation circuit for performing an operation using a subtractive shift type divide algorithm and, in particular, an operation apparatus and method using a dividing device which achieves an improvement on an operation of a signed dividend and divisor and on the method for detecting an overflow.

2. Description of the Related Art

The subtractive shift type divide algorithm, for example, is used for a divided operation, including a sign bit, which is performed on an information processing apparatus etc.—See Horikoshi "High-Speed Operation System of A Computer" issued by Kindai-Kagaku Co., Ltd. 1980—.

The subtractive shift type divide algorithm including a sign bit comprises taking the absolute value of a dividend and that of a divisor, performing an operation with the absolute values as positive numbers and determining a quotient and a remainder with the use of the signs of the dividend and divisor.

An overflow in a divide operation, that is, a state overflown beyond, for example, 16 bits is detected from the fact that a quotient cannot be represented with, for example, an unsigned 16-bit expression when a difference becomes "0" in a divide operation, dividend—(- divisor×$2^{16}$) or when no borrow occurs in a subtractive operation. The overflow in the divide operation whose quotient enters the signed bit expression is not detected until a full repeated operation is completed. For this reason, it is useless to necessarily take a one full cycle time against an exceptional event of an overflow rarely encountered. This causes a degraded operation efficiency.

In this context, the number of clocks all required in the aforementioned divide operation becomes: All the clock number = the number of clocks required for a repeated processing × the number of repetitions + the number of clocks required to find an absolute value × 2

+ the number of clocks required to correct the sign × 2

Here a shift in a repeated processing, if being performed by an ALU (an arithmetic logic operation unit), takes 3 to 4 clocks for repetition, meaning that about a half of all the clock number for a full processing are used up by the clock number except for the repeated processing.

In the conventional system, in addition to the repeated processing, a waste time (a head) has been encountered in the divide operation, including a sign bit, such as the pre-processing and post-processing, that is, the start of a requisite repeated processing following the finding of the absolute value of a dividend and that of a divisor and finally the finding of a quotient and remainder on the basis of a sign equality. The problem with the conventional system lies in that, even if the number of clocks for each repetitive operation can be reduced with a hardware for shift processing which performs a high-speed divide operation, it is not yet possible to reduce the number of clocks for full processing, to such an extent as has been expected due to an overhead involved. It has not been possible to achieve an adequately high speed unit compatible with a hardware investment. It is important to, not only reduce a requisite time for repeated operation but also to reduce such an overhead involved.

SUMMARY OF THE INVENTION

It is accordingly the object of the present invention to provide an operation apparatus and method which, with the use of an improved algorithm, can reduce a processing overhead involved upon the detection of an overflow and upon the performance of a divide operation using a signed dividend and divisor, and hence can achieve a adequately high speed.

In order to achieve the aforementioned object, the apparatus and method are provided as will be set forth below.

In an operation apparatus for obtaining a quotient and remainder in a divide operation, including a signed dividend and divisor, with the use of a subtractive shift type divide algorithm, the dividend and divisor are received as input values for operation processing and a subtractive operation is repeated when the dividend and divisor are equal in sign to each other and an additive operation is repeated when the dividend and divisor are different in sign from each other.

That is, the operation apparatus of the present invention receives a dividend or an intermediate result (a part of reminder) of an operation as a first input value and a value as a second input value which is obtained by shifting a divisor to an upper bit position side by a bit number corresponding to a difference between the number of bits of the demanded quotient, performs a subtractive operation between the first input value and the second input value when the dividend and divisor are equal in size to each other and an additive operation between the first input value and the second input value when the dividend and divisor are different from each other, and repeatedly performs a quotient bit determining step a predetermined number of steps on the basis of, at least, the occurrence of "0" in the subtractive or additive operation, the occurrence of a carry or a borrow and the sign of the dividend. If, in the repeated operation, a quotient bit determined is a first value with the dividend as the first input value, the operation apparatus treats as a first input value a value which is obtained by shifting the operation result to the one-bit-higher bit position. If, on the other hand, the quotient bit determined is a second value, a value is obtained which has shifted the first input value to a one-bit-higher bit position.

According to the aforementioned operation apparatus and method, the dividend and divisor are used as such in the operation processing without finding the absolute values of a dividend and divisor in a repeated preprocessing as in the case of a conventional operation apparatus. Since the operation processing is carried out with a sign added, it is possible to omit a sign correction processing.

In the dividing device for performing a divide operation with the most significant bit as a sign bit with the use of a subtractive shift type divide algorithm, a method is used which detects an overflow at an earlier stage of a repeated operation, that is, detects an overflow during a portion of a repeated operation.

That is, a control circuit is provided for this purpose which comprises sign determining means for determining whether or not a dividend and divisor are equal in sign to each other, cycle determining means for determining a cycle for calculating the most significant bit of a quotient or a cycle for calculating other than the most significant bit of the quotient, bit determining means for determining whether or not the bit of the quotient is "1", overflow determining means for determining the presence of an overflow in a divide operation when the dividend and divisor ar equal in size to each other, when a cycle is one for calculating the most significant bit of a quotient and when the bit of the quotient calculated is "1" and for determining the presence of an overflow in the divide operation when the dividend and divisor are different in sign from each other, when a cycle is one for calculating other than the most significant bit of the quotient and when the most significant bit of the quotient calculated is a negative value ("1"), and operation control means for coordinately controlling the operation of these means associated with each element therein.

According to the aforementioned means and method of the present invention, when the most significant bit of a quotient calculated is "1" upon the sign equality of the dividend and divisor or when the most significant bit of the quotient calculated is "1" upon the sign inequality of the dividend and divisor, it is possible to detect an overflow in the divide operation at a time a coincidence occurs between the other one of the quotient and the most significant bit of the quotient. It is, therefore, possible to achieve a high-speed divide processing as a whole since it is not necessary to use a conventional processing cycle for detection only and since a divide operation can be completed without requiring any wasteful operation time following the occurrence of an overflow.

DETAILED DESCRIPTION OF THE PREFERRED EMBODIMENTS

Figure 1:
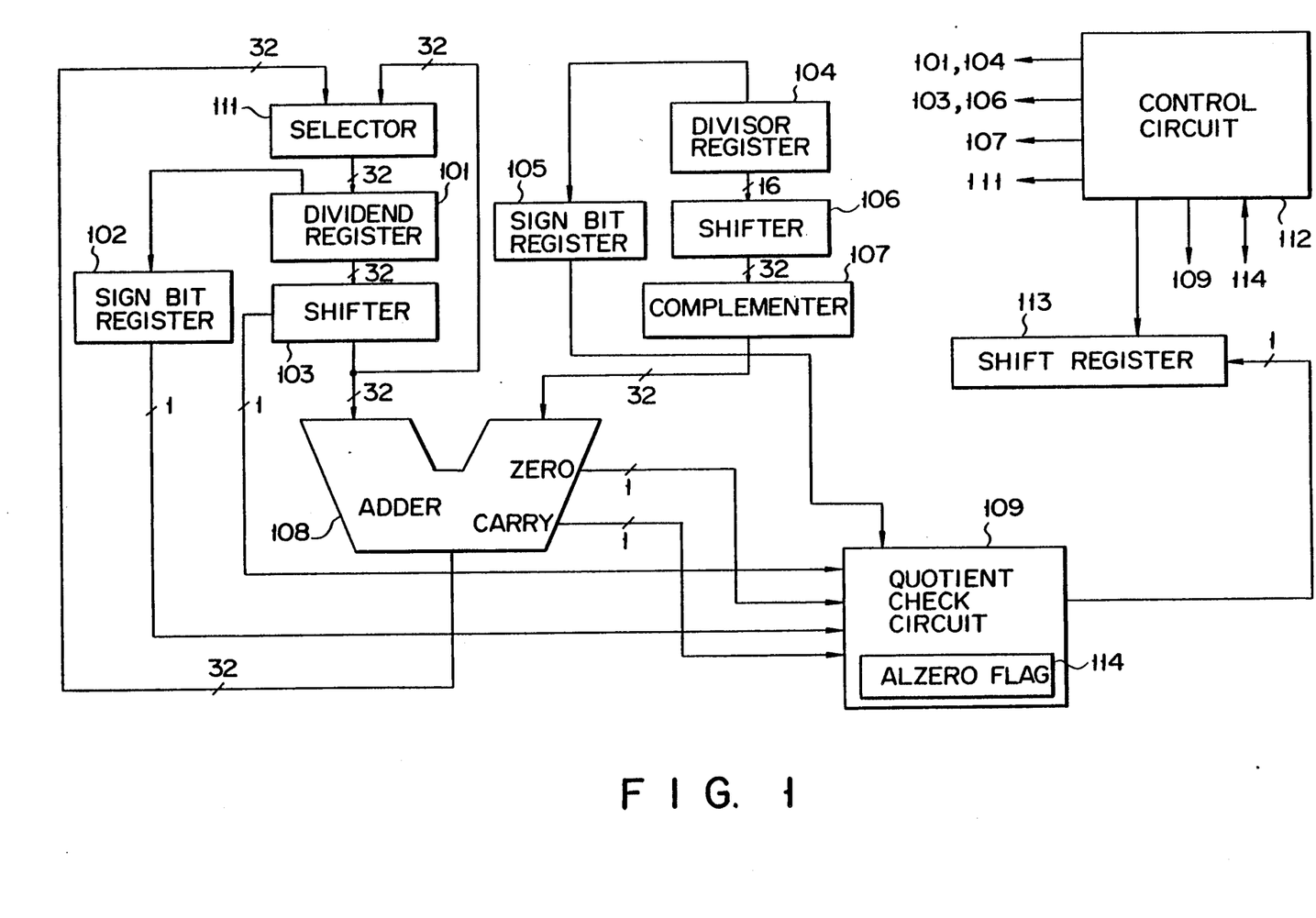
FIG. 1 is a schematic diagram showing a subtractive shift type operation apparatus according to a first embodiment of the present invention.

FIG. 1 is a block diagram showing an arrangement of an operation apparatus according to a first embodiment of the present invention. The operation apparatus including a dividing device can perform an operation on a 32-bit dividend and 16-bit divisor and find out a result of division involving a 16-bit quotient and a 16-bit remainder.

A dividend register 101 stores a 32-bit dividend as an initial value and can sequentially store an intermediate result (a part of reminder) of operation in an operation process. For a divide operation including a sign bit, a dividend to be stored is stored, as one with a sign bit, in the dividend register. The sign bit of the dividend is stored in a sign bit register 102. A shifter 103 shifts a value in the dividend register 101 to a one-bit-higher bit position and delivers a shift output or allows a value which is stored in the dividend register 101 to pass through.

On the other hand, a divisor register 104 stores a 16-bit divisor and, for a divide operation including a sign bit, can store a divisor, as one including the sign bit, in the divisor register as in the case of the dividend. The sign bit of the divisor is stored in sign bit register 105. A shifter 106 shifts the 16-bit divisor which is stored in the divisor register 104 to be shifted to a bit position which is higher than a bit number corresponding to the bit number of the demanded quotient, that is, 16 bits, and fixes it there. A complementer 107 complements the output of the shifter 106 when the dividend and divisor have the same sign and allows the output of the shifter 106 to pass through when they are different from each other. The respective 32-bit outputs of the shifter 103 and complementer 107 are input to first and second ports, respectively, in an adder 108. The adder 108 performs an operation on the output of the shifter 103 and output of the complementer 107. At that time, a zero flag representing "0" as a result of addition and signal representing a generation or no generation of a carry are supplied to a quotient check circuit 109. Respective sign bits of sign bit register 102 and 105 and overflow output of the shifter 103 are supplied to the quotient check circuit 109. The quotient check circuit 109 determines a quotient bit based on the information of these associated circuits and supplies the quotient bit, bit by bit, to a shift register 113. The quotient check circuit 109 includes an ALZERO flag 114 which is erected as "1" when the result of addition becomes "0". A selector 111 selects either one of the outputs of the adder 108 and shifter 103 on the basis of the determined quotient bit as set forth above and it is stored in the dividend register 101. A control circuit 112 is adapted to control the associated circuits and to implement a repetitive operation. It is to be noted that an actual circuitry, though not shown in the Figures, properly includes not only the aforementioned circuits but also an internal bus, register-to-register path, general register file etc.

The detailed processing steps of the control circuit 112 in the operation apparatus shown in FIG. 1 will be explained below with reference to FIGS. 2A to 2D.

Figure 2A:
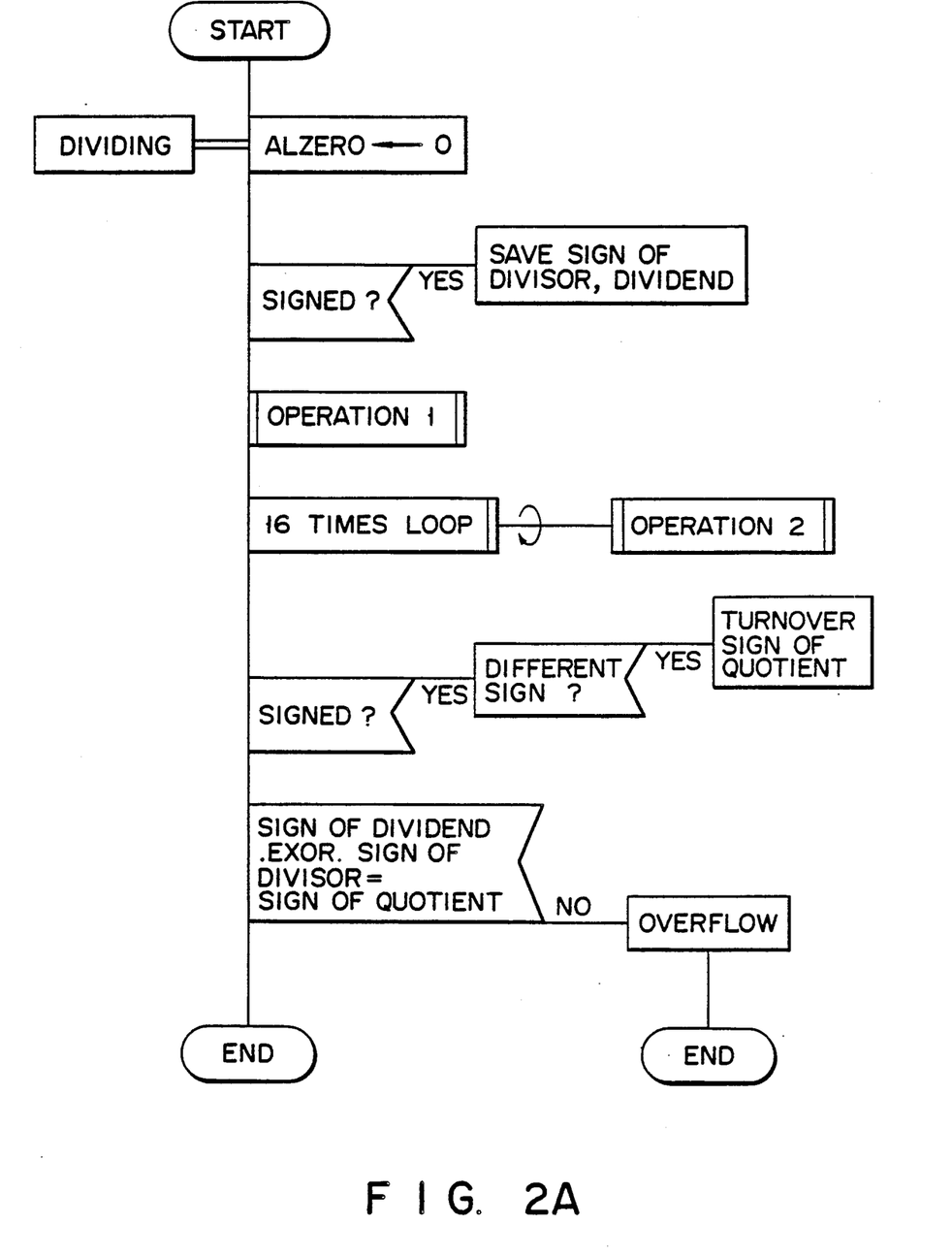
FIGS. 2A, 2B, 2C and 2D show flowcharts for explaining a processing action of the operation apparatus of FIG. 1.

FIG. 2A shows a main flowchart. First, the ALZERO flag 114 is initialized to "0". The operation apparatus checks if a divide operation includes a sign bit or not. If yes, the operation apparatus allows the signs of the dividend and divisor to be stored in the sign bit registers 102 and 105. Then the operation apparatus performs an operation 1 for checking any overflow.

Figure 2B:
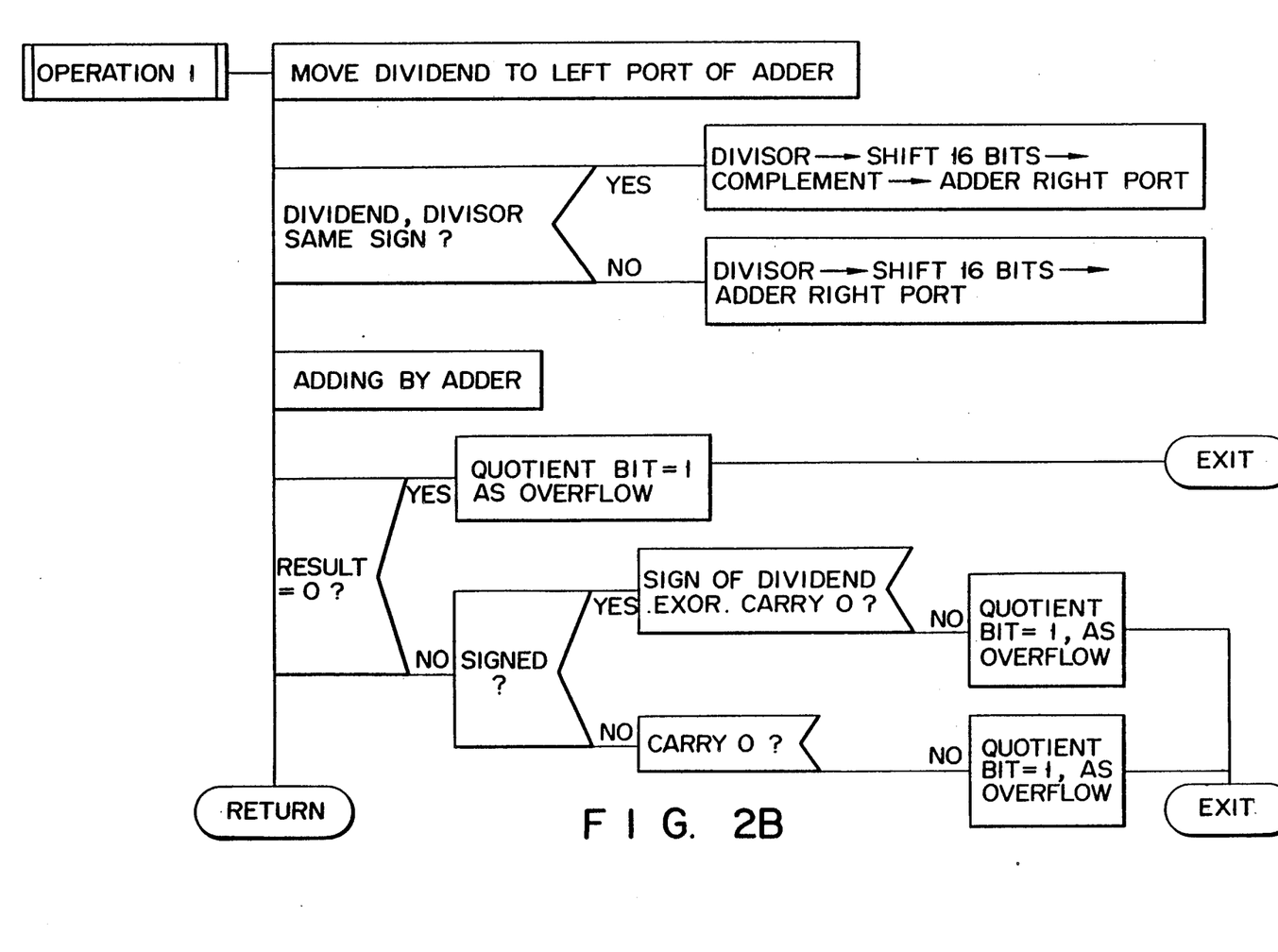

FIG. 2B shows a subroutine flowchart for performing the operation 1 for checking any overflow. First, a 32-bit dividend which is stored in the dividend register 101 is fed to the first port of the adder 108. The operation apparatus refers to the values of the sign bit registers 102 and 105 and, if the dividend and divisor are equal in sign to each other, allows the 16-bit divisor which is stored in the divisor register 104 to be shifted by the shifter 16 to the upper bit position in a 16-bit unit so that it is supplied to the second port of adder the 108 after complemented by the complementer 107. If the dividend and divisor are different in sign from each other, the operation apparatus allows the 16-bit divisor which is stored in the divisor register 104 to be 16-bit shifted by the shifter 106 to the upper bit position side and allows it to be passed through. In this way, the divisor is supplied to the second port of the adder 108 where an add operation is implemented.

The aforementioned relation will be explained below with reference to FIG. 3A.

Figure 3A:
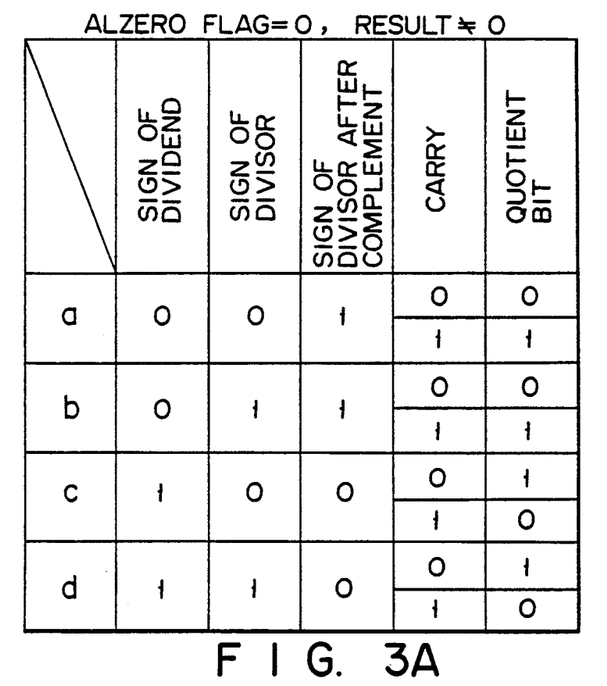
FIGS. 3A and 3B are a quotient bit determining table for the first embodiment of the present invention.
Figure 3B:
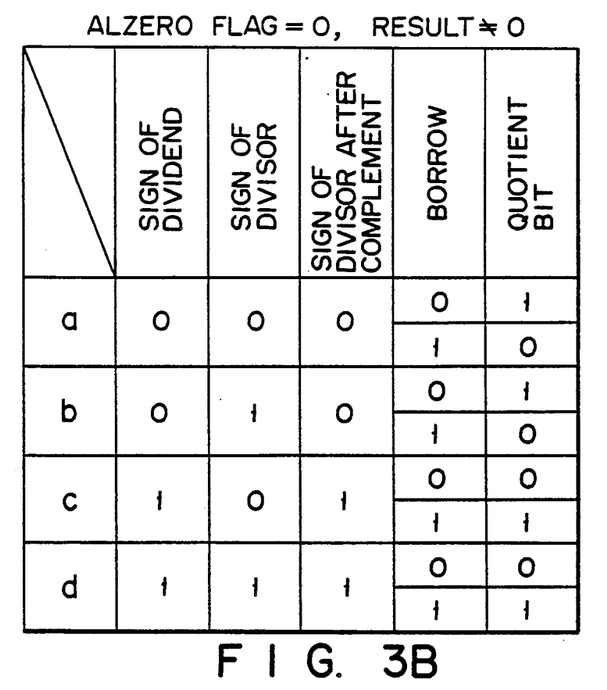

If the dividend and divisor are equal in their sign as in a, d in Table in FIG. 3A, a divide operation is repeated and, if they are different in their sign, an additive operation is repeated. By so doing, the absolute value is subtractively carried out. Since this first embodiment uses the adder 108 as an operation means, the divisor is complemented in the former case so that an operation may be subtractively effected using the adder. If a quotient bit=1 as a result of the operation, the quotient is determined as involving an overflow of 17 bits and over and the operation is ended. It is to be noted that the quotient bit is determined based on the following requirements which are applied not only to the operation 1 but also an operation 2:

(1) If a result of operation is "0", the quotient bit=1

(2) If a divide operation including a sign bit is effected, the quotient bit=the sign of the dividend EXOR a carry (3) If a divide operation not including any sign bit is effected, the quotient bit=an overflow of the shifter 103 OR a carry.

The case (1) means that the dividend can be just divided by the divisor. If the case (2) is explained using FIG. 3A,

|dividend| > |divisor| is required to obtain a quotient=1. If the sign of the dividend is positive (0), a carry is generated when the dividend>|divisor| to obtain a quotient bit=1. If the sign of the dividend=0, then a quotient bit=1 at a carry=1 and a quotient bit=0 at a carry=0 as shown in FIG. 3A. Let it be assumed that the sign of the dividend is negative (1). In this case, no carry is generated when,

|dividend| > |divisor| to obtain a quotient bit=1. If the sign of the dividend=1, then a quotient bit=1 at a carry=0 and a quotient bit=0 at a carry=1 as shown in FIG. 3A. Since the shift operation of the shifter 103 is not yet performed in the event of an overflow check, the shifter involves no overflow. Thus in the case of the operation 1 only a carry is referred to when a divide operation is to be carried out.

Upon the completion of the operation 1, an operation 2 is repeatedly carried out next.

Figure 2C:
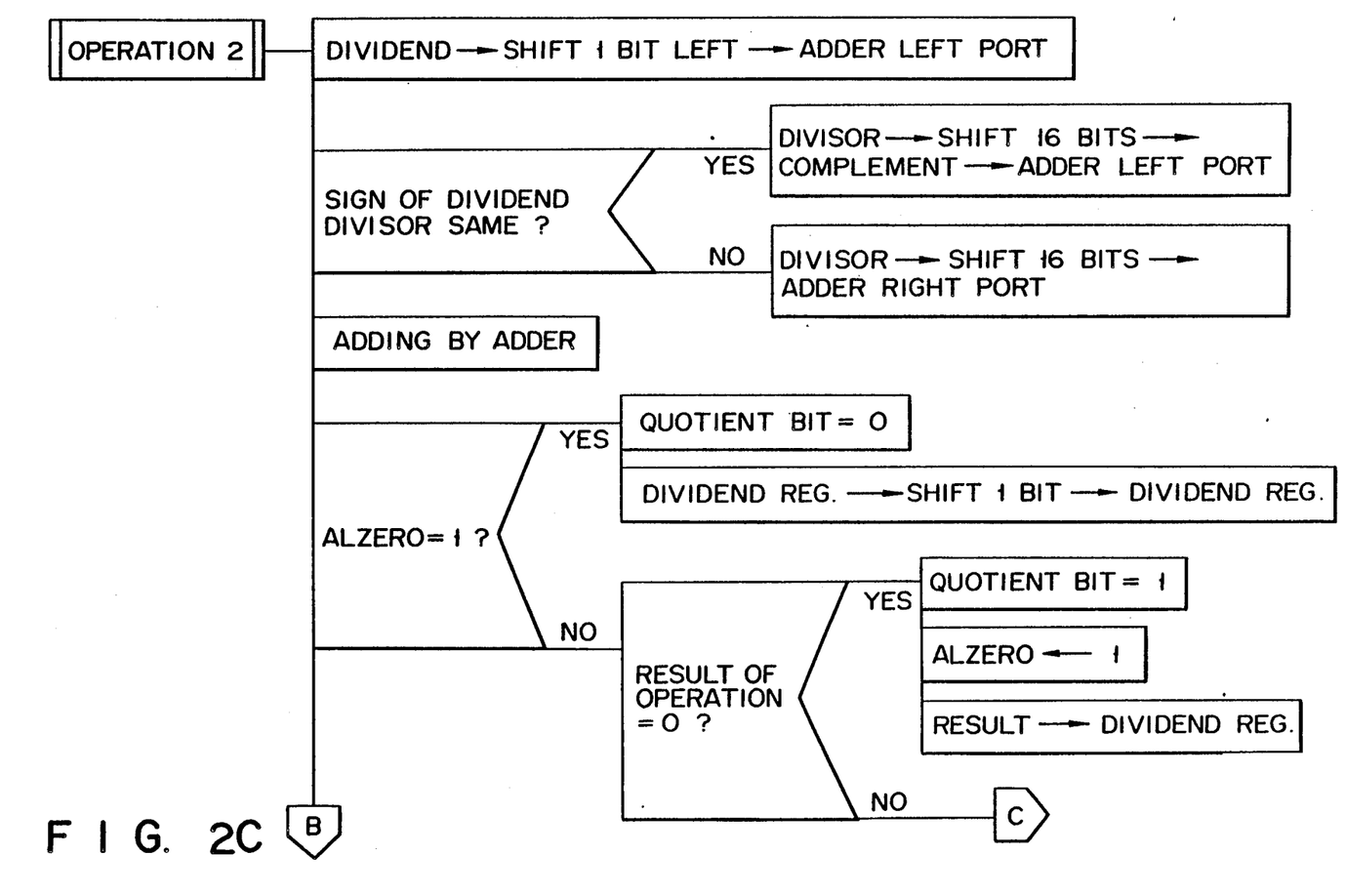
Figure 2D:
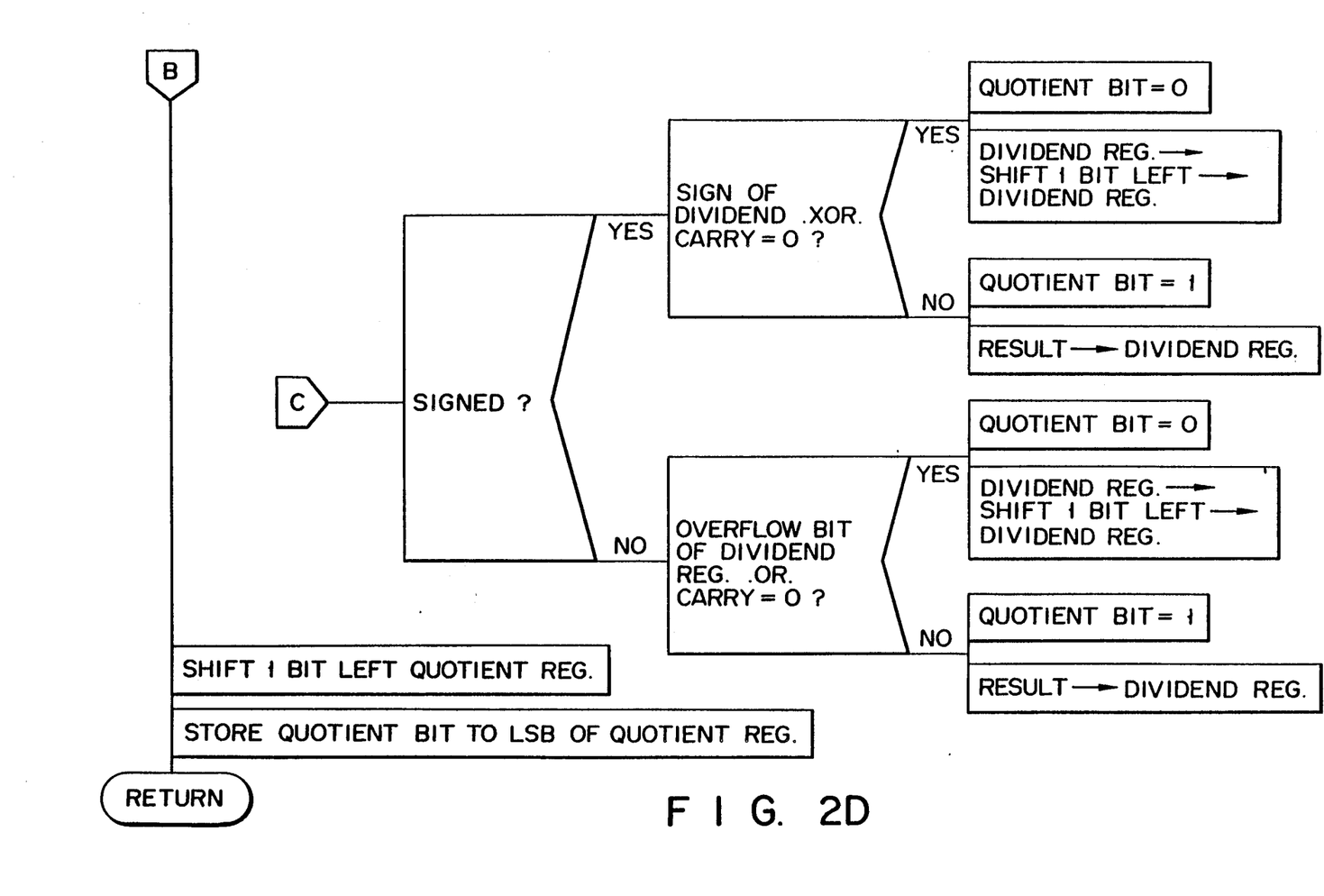

The steps for the operation 2 are carried out as shown in FIG. 2C and 2D. In the operation 2, a value obtained by shifting a value of a dividend register 101 by the shifter 103 to a one-bit-higher bit position side and a value obtained by 16-bit shifting a value of the divisor register 104 by the shifter 106 to an upper bit position side and selectively performing a complement operation are supplied to the input ports of the adder 108. By so doing, an additive operation is carried out and a quotient bit is determined using the requirement of the operation 1. A quotient bit thus determined is shifted to the lowest bit position of the shift register 113. If a quotient bit=1, a result of addition by the adder 108 is selected by the selector 111 and stored in the dividend register 101. For the quotient bit=0, the output of the shifter 103 is selected by the selector 111 and stored in the dividend register 101. The aforementioned requirement can be applied to the case of ALZERO=0 only. If a result of operation is "0", then ALZERO=1. Therefore, a subsequent repetitive operation is effected at a quotient=normally "0". In the event of a negative dividend, it is possible to prevent an error quotient bit from being output based on the aforementioned reference, by using the ALZERO flag 114.

By performing the operation 2, sixteen times, in repetitive fashion, it is possible to sequentially obtain a 16-bit quotient. In this way, a 16-bit remainder is found at the upper 16-bit position of the dividend register 101. The quotient found at this time is represented as an absolute value in which case the remainder is expressed as one with a sign bit because the divided is used with the sign added thereto upon the implementation of the operation. For this reason, it is possible to save the remainder sign correction processing.

Upon the completion of the operation 2, reference is made to the sign bits of the sign bit registers 102, 105 in the event of a divide operation using a sign bit, as shown in FIG. 2A. If the dividend and divisor are different in sign from each other, the quotient as found as the absolute value is subjected to a sign-inverting processing. The operation apparatus checks for a consistency with the sign of the dividend, the sign of the divisor and the sign of the quotient thus found. The operation apparatus determines an overflow if an inconsistency is found and a correct operation result if a consistency is found. In this way, a series of processing steps is completed.

In this way, according to the first embodiment, the signed dividend and divisor are dealt with as they are and, using an operation means composed of the complementer 107 and adder 108, a subtractive operation is implemented if the dividend and divisor are found to have the same sign and an additive operation is performed if they are found to have a different sign. It is thus possible to save a repeated pre-processing. Since a remainder found is a signed one, it is possible to omit a post-processing for correcting the sign of the remainder. Furthermore, the repeated operation processing can be adequately performed on a high-speed hardware unit as in the case of a conventional counter-part. As a result, the present operation apparatus can assure a high-speed processing which is compatible with a whole high-speed hardware unit.

The present invention is not restricted to the aforementioned first embodiment only. Although, in the first embodiment, the complementer 107 and adder 108 have been explained as being used as an operation means, an implementer and subtractor, for example, may be used as such. In this case, the complementing of the divisor is achieved only when the dividend and divisor are different from each other. In the case of a divider operation including a sign bit, it is only necessary to determine a quotient bit based on the requirement:

the quotient bit = ~(the sign of the dividend EXOR a borrow)

provided that ~: negation

Figure 4:
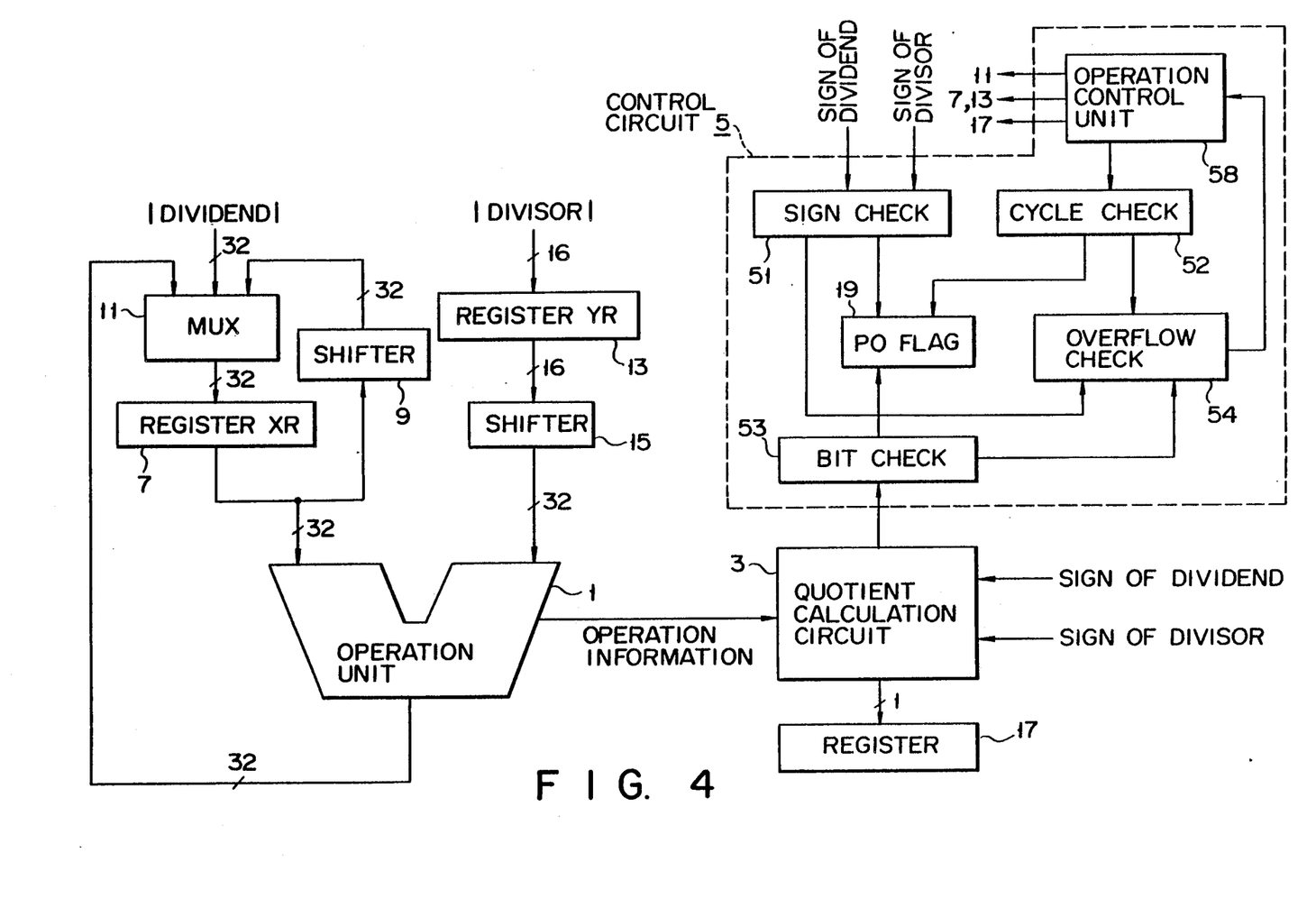
FIG. 4 is a schematic view showing a subtractive shift type operation apparatus of the present invention.

FIG. 4 shows an operation apparatus according to a second embodiment of the present invention. This operation apparatus including a dividing device shown in FIG. 4 determines the occurrence of an overflow during a portion of a repeated operation for finding a quotient and stops a divide operation processing at a time when that overflow occurs.

The dividing device performs a divide operation including a 32-bit dividend and 16-bit divisor, containing a sign bit, and finds a 16-bit quotient and remainder.

The divide operation is repeatedly performed in accordance with a corresponding basic algorithm. In the arrangement shown in FIG. 4, the dividing device is broadly divided into an operation unit 1 for performing a divide operation, a quotient calculation circuit 3 for calculating a quotient in accordance with a result of the operation made by the operation unit 1, and a control circuit 5 for controlling the divide operation processing.

The operation unit 1 receives a value at one input which is stored in a register (XR) 7. The register 7 is supplied with the absolute value of a 32-bit dividend (hereinafter referred to as |dividend|) upon the start of a divide operation and stores it. Upon the execution of a repeated operation, the register 7 has its value one-bit shifted to the left or has an intermediate result (partial remainder) of the repeated operation stored therein so that it is output as such to the operation unit 1. The value thus stored is supplied to the operation unit 1. The value thus stored is supplied to the operation unit 1 or a shifter 9.

The shifter 9 allows the |dividend| and partial remainder which are supplied from the register 7 to be one-bit shifted to the left. The left-shifted value of the shifter 9 is supplied to a multiplexer (hereinafter referred to as an MUX) 11. MUX 11 receives the |dividend| and the partial remainder from the operation unit 1 such that they are alternatively selected. That is, MUX 11 selects the |dividend| at the start of a divide operation, selects a partial remainder output from the operation unit 1 upon the completion of the divide operation by the operation unit 1, and selects an output of the shifter 9 at the time of starting the next operation following the storing of the partial remainder in the register 7.

The operation unit 1 receives, at the other input, a value which is shifted from a shifter 15 after it has received that value from a register (YR) 13. The register 13 is of such a type that it receives the absolute value (hereinafter referred to as |divisor|) of a 16-bit divisor and stores it. The |divisor| of the register 13 is supplied to the shifter 15 where it is 16-bit shifted to the left to provide a 32 bit. That is, the shifter 15 shifts the |divisor| so as to adjust the most significant bits of the |divisor| and |dividend|.

The operation unit 1 subtracts, upon receipt of the values from the registers 7 and 15, the value of the shifter 15 from the value of the register 7. A result of subtraction is supplied as a partial remainder to the MUX 11. The operation unit 1 supplies operation information representing a presence or absence of a borrow and a presence or absence of "0" as a result of subtraction to the quotient calculation circuit 3.

The quotient calculation circuit 3 operates on the repeated operation information from the operation unit 1 in terms of the signs of the dividend and divisor to obtain a 1-bit quotient. The quotient calculation circuit 3 sets the quotient bit to be "0" when a borrow occurs in a subtractive process. The quotient calculation circuit 3, on the other hand, sets the quotient bit to be "1" when a result of the subtractive operation becomes "0" or when no borrow occurs in the subtractive process.

The absolute-value type quotient thus calculated is sequentially supplied to the register 17 for storage. That is, in the case where no overflow occurs in the operation process, the quotient calculation circuit obtains a quotient for every 16 repeated subtractive operations and supplies it to the register 17. In this way, a 16-bit quotient is stored in the register 17 upon the completion of the subtractive operation. Since no sign consideration is paid to the absolute value type quotient in the register 17, the determination of the sign is carried out. If the dividend and divisor are different in sign from each other, then a quotient becomes a negative number and hence the sign of the quotient in the register 17 is turned over.

The quotient calculation circuit 3 supplies information representing a calculated quotient bit=0 or 1 to the control circuit 5. Further, the quotient calculation circuit 3 determines, based on the sign of the dividend and that of the divisor, whether or not the dividend and divisor is equal in sign to each other. This determinating processing is performed by, for example, an EXOR (an exclusive logic OR) gate and a result of determination is supplied to the control circuit 5.

The control circuit 5 is a circuit serving as a control center in the subtractive processing and controls the subtractive or the other operations of the operation unit 1 and quotient calculating operation of the quotient calculation circuit. The control circuit 5 includes a pre-over flag (hereinafter referred to "PO flag" 19 which represents the most significant bit state of a quotient thus calculated by the quotient calculation circuit 3. That is, the PO flag 19 erects, for example, "0" if the most significant bit of the quotient="0" and erects "1" if the most significant bit of the quotient="1".

The control circuit 5 determines whether the operation unit 1 is in a repetitive operation cycle for finding a quotient or in an operation cycle for finding a quotient bit following the most significant bit. The determination is made by referring to, for example, the contents of a counter whereby the number of operations is confirmed. Furthermore, the control circuit 5 determines whether or not an overflow occurs and sends an instruction for interrupting a divide operation, if any overflow occurs. Further, the overflow is detected in a manner set forth in more detail below.

First, a first overflow is detected based on the fact that a result of subtracting a 16-bit left-shifted divisor from the |dividend| or that no borrow is generated by so doing. That is, with the result of the subtraction, the control circuit 5 determines that an overflow occurs in the divide operation. This is an approach using the same algorithm as set forth above.

Figure 5:
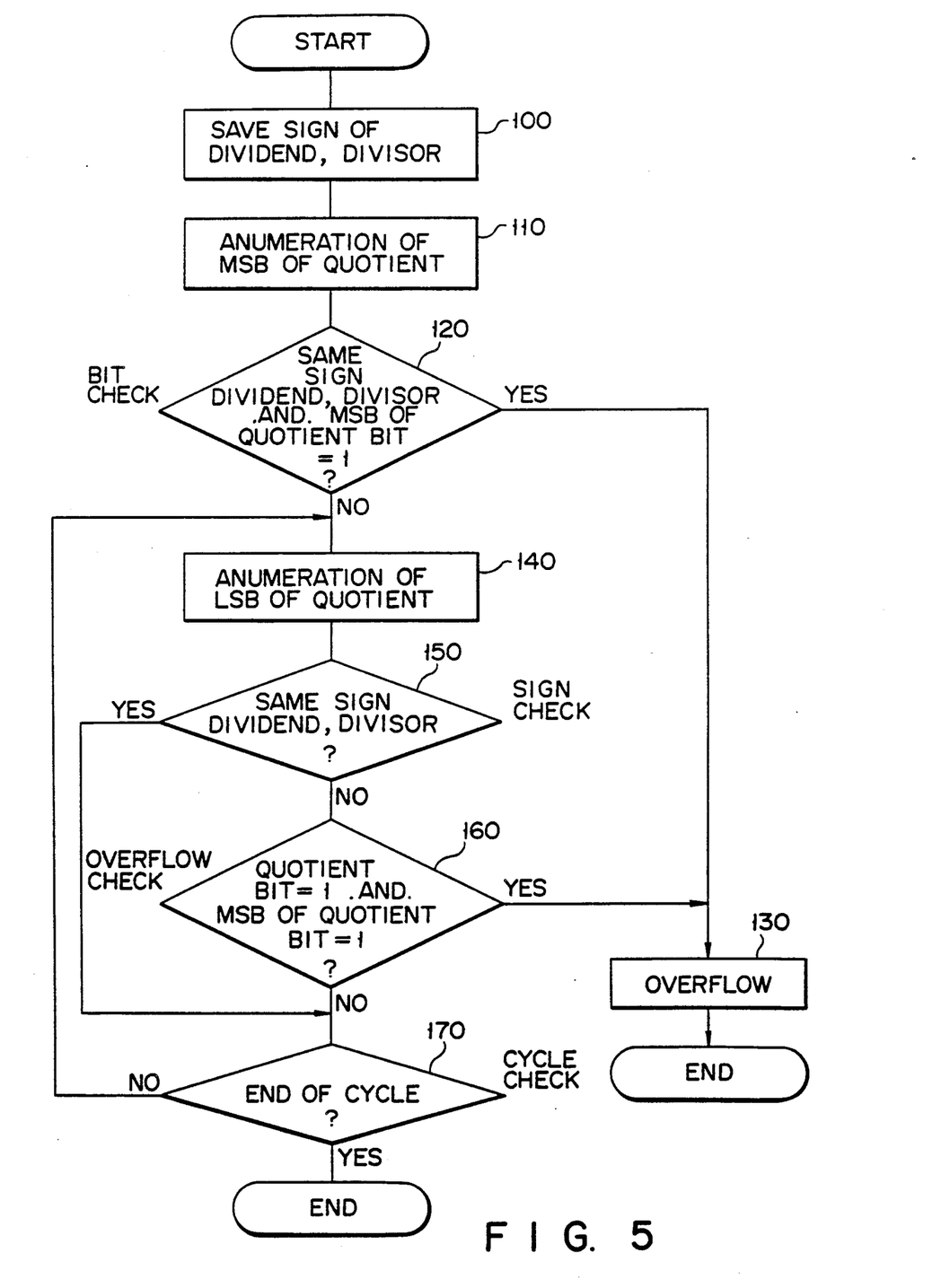
FIGS. 5 and 6A and 6B show a flowchart showing a processing action of the apparatus according to a second embodiment of the present invention.

Detecting the second and third overflows which constitutes the feature of the present invention will be explained below with respect to a control flowchart of the control circuit 5 shown in FIG. 5.

First, the signs of the dividend and divisor are held in the quotient calculation circuit 3 at step 100 and a subtractive operation is effected by the operation unit 1 to find the most significant bit at step 110. The control circuit 5, if the most significant bit of a quotient is "1" and the dividend and divisor are equal in sign to each other—step 120 Yes—, determines that an overflow occurs in the subtractive operation (step 130) and halts the subtractive operation. In this way, a second overflow is detected.

If, on the other hand, the most significant bit of the quotient is "0" and the dividend and divisor are different in sign from each other—step 120, NO—, it is possible to calculate that bit of a quotient following the most significant bit of the quotient (step 140).

If the dividend and divisor are different in sign from each other (step 150, NO), the bit of a quotient thus calculated="1" and the most significant bit of the quotient="1" (step 160, Yes), then the control circuit 5 determines that an overflow occurs (step 130) and halts the divide operation. This corresponds to the detection of a third overflow.

In the event of the dividend and divisor being equal in sign to each other (step 150, Yes), the lower bit of the quotient is subsequently carried out (step 170, No) and it is determined whether or not an overflow occurs as set out above. In this way, the control circuit 5 determines whether or not an overflow occurs. The second embodiment of the present invention is so configured as set forth above.

Figure 6A:
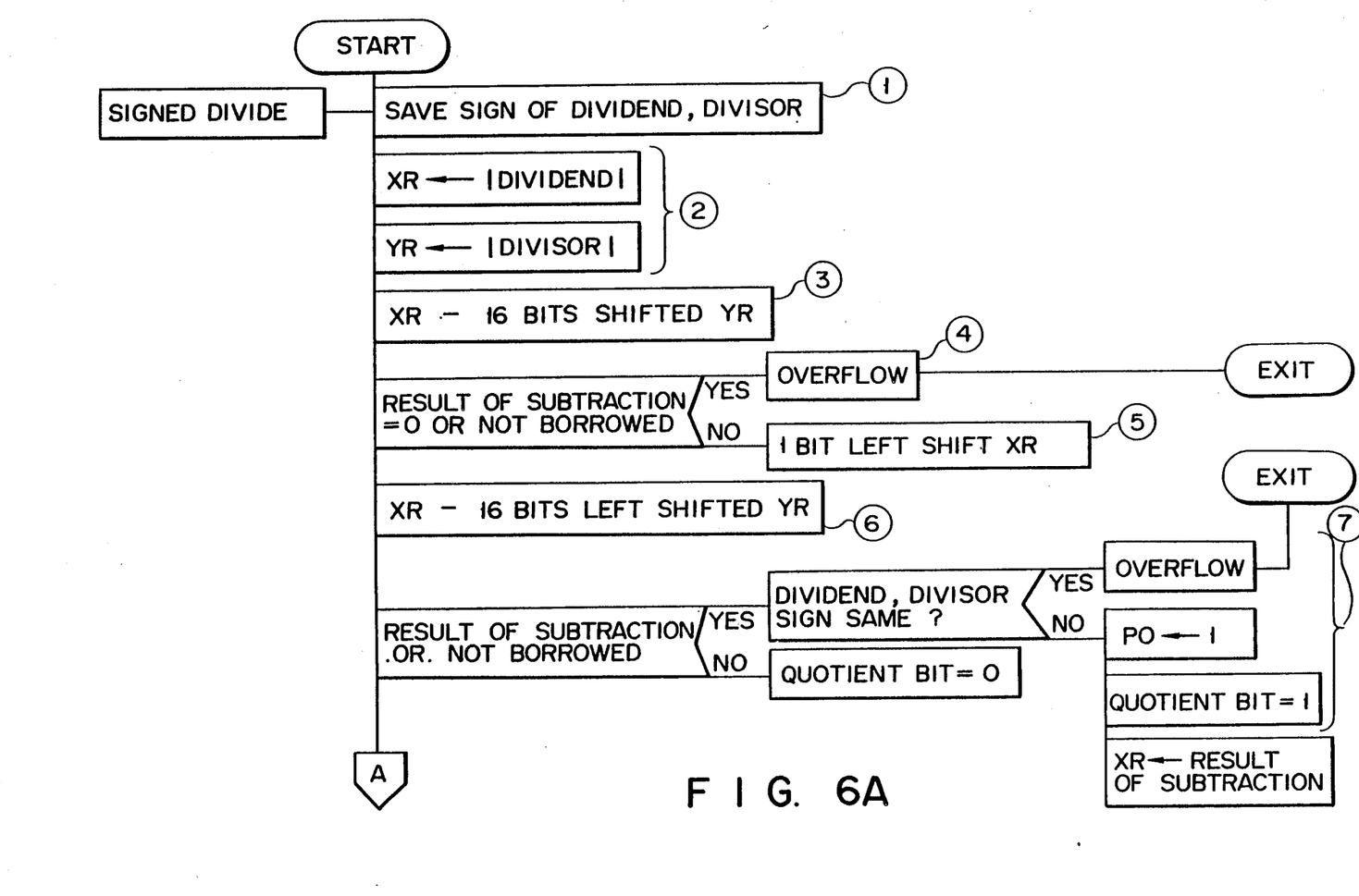
Figure 6B:
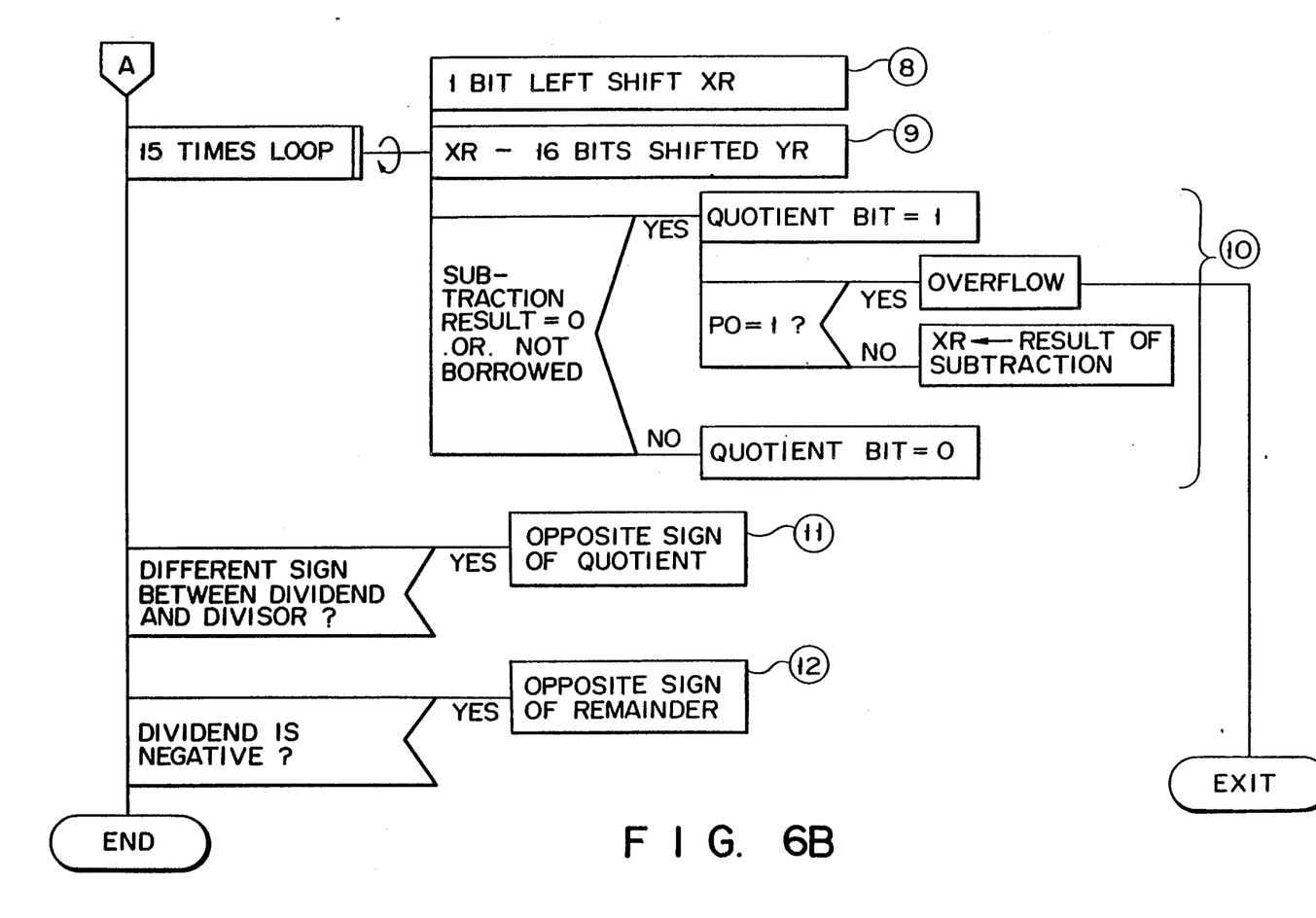

The steps of the divide operation algorithm for the second embodiment of the present invention will be explained in more detail below with respect to FIGS. 6A and 6B.

(1) The signs of a dividend and divisor are supplied to the quotient calculation circuit 3 for storage.

(2) The absolute values of the dividend and divisor are taken and the |dividend| is sent via the MUX 11 to the register 7 where it is stored and the |divisor| is sent to the register 13 where it is stored.

(3) The |divisor| in the register 13 is sent to the shifter 15 where it is 16-bit shifted to the left. The left-shifted |divisor| is sent to the operation unit 1 where it is subtracted from the |dividend| which is sent from the register 7.

(4) If a result of subtraction is "0" or no borrow occurs in the subtractive operation, the quotient cannot be represented as a 16-bit one and hence it is determined at this time that an overflow occurs.

(5) If no overflow occurs, the dividend in the register 7 is 1-bit shifted by the shifter 9 to the left and sent via the MUX 11 back to the register 7.

(6) The |divisor| in the register 13 is 16-bit shifted by the shifter 15 to the left and sent from the shifter 15 to the operation unit 1 where it is subtracted from the value which is sent from the register 7.

(7) Upon the occurrence of a borrow in the subtractive operation, the most significant bit of the quotient is "0". If the result of subtraction is "0" or no borrow occurs at that time, the most significant bit of the quotient is "1". If, at that time, the dividend and divisor are equal in sign to each other, the quotient enters into the sign bit, resulting in an overflow.

If, on the other hand, the dividend and divisor are different in sign from each other, no overflow is ascertained at that time and an overflow is found out when the quotient bit=1 in the subsequent repetitive operation. In order to show "the most significant bit of the quotient=1" in that case, the PO flag 19 erects "1". The result of subtraction is selected by the MUX 11 and sent to the register 7 where it is stored as a partial remainder.

(8) The partial remainder in the register 7 is sent to the shifter 9 where it is 1-bit shifted to the left, and sent back to the register 7 for storage.

(9) The |divisor| in the register 13 is supplied to the shifter 15 where it is 16-bit shifted to the left. The left-shifted value is sent to the operation unit 1 where it is subtracted from the partial remainder which is stored in the register 7.

(10) When a borrow occurs as a result of subtraction, the quotient bit becomes "0". If, on the other hand, the result of subtraction becomes "0" or no borrow occurs in the subtractive operation, the quotient bit becomes "1" and the result of subtraction, that is, the partial remainder, is held in the register 7. If, at this time, the quotient bit becomes "1" when the PO flag 19 erects "1" as set forth above, an overflow is ascertained at that time, halting a series of the divided operations.

(11) Unless no overflow occurs, the series of the operations as set forth above is performed 15 times and quotients are computed, by the quotient calculation circuit 3, sequentially from the upper bit first. The 16-bit quotient thus calculated is obtained as an absolute value in the register 17 and the 16-bit remainder is obtained as an absolute value in the upper 16-bit position of the register 7.

(12) If the dividend and divisor are different in sign from each other, the quotient becomes a negative number and hence the quotient in the register 17 has sign inverted or turned over.

(13) In the event of a negative divided, the remainder becomes a negative number and hence the remainder has sign turned over.

In this way, the divide operation processing is carried out. If the quotient becomes "8000" (hexadecimal 2-byte representation), that is, the most significant bit of the quotient is "1" with the other quotient bits all being "0", the PO flag 19 erects "1", but it is not determined as being an overflow since the quotient bits as calculated in the steps (8) to (10) all become "0". It is thus possible to obtain a correct division result.

According to the aforementioned processing, whichever form the quotient takes, the occurrence of an overflow can be earlier detected without the necessity of performing the divide operation processing to the last.

What is claimed is:

1. An operation apparatus including a divide operation device, comprising:

dividend memory means for sequentially storing a dividend and a numerical value corresponding to an intermediate result of a divide operation;

first sign bit storing means for storing a sign bit of the dividend;

first shift means for shifting the numerical value in the dividend memory means to a 1-bit-higher bit position;

divisor memory means for storing a divisor;

second sign bit storing means for storing a sign bit of the divisor;

second shift means for shifting the divisor in the divisor memory means to an upper bit position side by a difference between the number of bits of the divisor in the divisor memory means and that of the dividend;

operation means for performing a subtractive operation between an output of the first shift means and an output of the second shift means when a value in the first sign bit storing means is equal to that in the second sign bit storing means and for performing an additive operation between an output of the first shift means and an output of the second shift means when an value in the first sign bit storing means is different from that in the second sign bit storing means;

quotient determining means for determining, at least, whether or not a result of an operation by the operation means is "0", whether a carry or a borrow occurs, and a value of a quotient bit, on the basis of a value of the sign bit which is stored in the first sign bit storing means, said quotient determining means being connected to said first and second sign bit storing means, said first shift means and said operation means;

select means for selecting a result of an operation by the operation means when a quotient bit which is determined by the quotient determining means is a first value and storing it in the dividend memory means and for selecting an output of the first shift means when a quotient bit which is determined by the quotient determining means is a second value and storing it in the dividend memory means; and control means for controlling said dividend and divisor memory means, first and second sign bit storing means, first and second shift means, operation means, quotient determining means and select means so that an operation by the operation means is performed a predetermined number of times.

2. The operation apparatus according to claim 1, wherein said dividend memory means comprises a dividend register for storing a 32-bit dividend as an initial value and sequentially storing an intermediate result in an operation process and for, if a dividend being stored is involved in a divide operation including a signed bit, storing it as a signed one.

3. The operation apparatus according to claim 1, wherein said first sign bit storing means comprises a sign bit register for storing a sign bit of a signed dividend.

4. The operation apparatus according to claim 1, wherein said second sign bit storing means comprises a sign bit register for storing a sign bit of a signed divisor.

5. The operation apparatus according to claim 1, wherein said first shift means comprises a shifter for shifting a value in said dividend memory means to a one-bit-higher bit position in second and repeated steps in said divide operation and for allowing a value in the dividend memory means to pass through on a first step of said divide operation.

6. The operation apparatus according to claim 1, wherein said second shift means comprises a shifter for shifting a divisor of a predetermined bit number in said divisor memory means to an upper bit position side by the number of bits corresponding to a difference between the bit number of a dividend and that of the divisor.

7. The operation apparatus according to claim 1, wherein said divisor memory means comprises a divisor register for storing a divisor of a predetermined bit and, when the divisor is a signed divisor, storing it as a signed one.

8. The operation apparatus according to claim 1, wherein said operation means comprises:
a complementer for complementing an output of said second shift means; and
an adder for receiving an output of a predetermined bit number of said first shift means and an output of a predetermined bit number of the complementer at its first and second ports, respectively, and for performing an operation on these outputs.

9. The operation apparatus according to claim 1, wherein said quotient determining means receives a zero flag from said operation means representing "a result of an additive operation=0", a signal representing a presence or absence of a carry, sign bits of said first and second sign bit storing means and an overflow output of said first shift means, said quotient determining means determines a quotient bit on the basis of logical operations of these information items and shifts quotient bits, bit by bit, into said first shift means, said quotient determining means further including flag means for storing an ALZERO flag which is erected at "1" when the result of additive operation becomes "0" and an exclusive OR gate receiving said sign bit of the dividend and said signal representing presence or absence of a carry.

10. The operation apparatus according to claim 1, wherein said select means comprises a selector for selecting either one of an output of said operation means and an output of said first shift means and storing it in said dividend storing means.

11. The operation apparatus according to claim 1, wherein said control means comprises circuit means including at least one of a plurality of registers, an internal bus and register-to-register path, and a control circuit having a microprocessor containing a control program which controls the circuit means and control means via said bus and implementing an additive or a subtractive operation in a repeated fashion.

12. An operation apparatus including a dividing device for performing a divide operation for finding a quotient between a dividend and a divisor, having a most significant bit as a sign bit, comprising:
sign determining means for determining whether or not a dividend is equal in sign to a divisor;
cycle determining means for determining, in said divide operation, a first cycle for finding the most significant bit of a quotient and a second cycle for finding other than the most significant bit of the quotient;
bit determining means for determining whether or not the calculated quotient bit is a negative value;
overflow determining means for determining the presence of an overflow in a divide operation when the sign determining means determines a sign equality of the dividend and divisor, when the cycle determining means is in the first cycle and when the bit determining means determines that the bit of the quotient represents a negative value, and for determining the presence of an overflow in the divide operation when the sign determining means determines a signal inequality of the dividend and divisor, when the cycle determining means is in the second cycle and when the bit determining means determines that the bit of the quotient represents a negative value and that the uppermost bit of the quotient already obtained is a negative value; and
operation control means for controlling a progress of an operation processing, while supervising the sign, cycle, bit, and overflow determining means;
wherein said sign determining means comprises an exclusive OR gate for determining whether or not said dividend nd divisor are equal in sign to each other, and
said cycle determining means, said signal determining means and said bit determining means are each operatively connected to said overflow determining means, and said operation control means is connected to said sign, cycle, bit, and overflow determining means.

13. The operation apparatus according to claim 12, wherein said cycle determining means comprises a read-only memory for storing a software program and determines whether said operation processing is in a repeated operation cycle for finding a quotient or in a cycle for finding a quotient bit following the most significant bit while referring to the contents of a counter connected thereto and, at the same time, ascertains the number of repeated operations.

14. The operation apparatus according to claim 12, wherein said bit determining means comprises a ROM for storing a software program for determining whether a quotient bit is positive or negative, said quotient bit being set to "0" by said bit determining means when a borrow occurs in a substraction processing performed by a quotient calculation circuit and to "1" when a result of the subtractive processing is "0" and when no borrow occurs in the subtractive processing.

15. The operation apparatus according to claim 12, wherein said overflow determining means comprises a ROM (read-only memory) for storing a software program for performing first to third overflow determinations;

said first overflow determination being made by subtracting from an absolute value of said dividend the absolute value of a divisor which has been 16-bit shifted to an upper bit position side and determining the presence of an overflow in a divide operation when a result of the subtractive operation is "0" or no borrow occurs and halting the divide operation;

said second overflow determination being made by finding the most significant bit of a quotient in the subtractive operation by means of the operation unit after the signs of the dividend and divisor have been held in a quotient calculation circuit, determining that the most significant bit of the quotient calculated is "1" and that the dividend and divisor are equal in sign to each other and halting the divide operation; and the third overflow determination being made by finding a quotient bit following the most significant bit of a quotient when the most significant bit of the quotient is "0" or when the dividend and divisor are different in sign from each other, determining the presence of an overflow in the divide operation when the quotient bit calculated is "1", when the most significant bit of the quotient is "1" and when the dividend and divisor are different in sign from each other, and halting the divide operation.

16. The operation apparatus according to claim 12, wherein:

said operation control means comprises a multiplexer and a plurality of registers and controls the operation of the multiplexer and registers in accordance with a result of determination by said cycle determining means to allow the operation to be implemented and halts the operation action when said overflow determining means detects an overflow in a divide operation;

said operation control means further includes an internal bus, a register-to-register path and a general register, said operation control means and said overflow determining means being connected to said cycle determining means; and said register-to-register path is connected between the registers and said internal bus connects all elements of the operation means.

17. The operation apparatus according to claim 12, wherein said operation control means further comprises a quotient calculation circuit and is of such a type that, in a subtractive processing performed by said quotient calculation circuit for finding a quotient on the basis of operation information coming from an operation unit for performing an operation processing, the quotient calculation circuit sets a quotient bit to "0" when a borrow occurs and to "1" when a result of subtraction becomes "0" or when no borrow occurs in the subtraction operation, finds a quotient for each subtractive operation repeatedly performed a predetermined number of times when no overflow occurs during a portion of the subtractive operation, sends the found quotient of a given bit to a register associated with the quotient calculation circuit, supplies to said bit determining means an information item representing that the calculated quotient bit is "0" or "1", determines a sign equality or inequality of said dividend and divisor on the basis of the signs of the dividend and divisor with the use of an exclusive OR gate, and supplies a result of determination to said bit determining means, said quotient calculation circuit being connected to said bit determining means, said register and said operation unit.

18. The operation apparatus according to claim 12, wherein said operation control means comprises a read only memory for storing a software program for controlling an operation action of an operation unit in a subtractive operation and a quotient calculation action of a quotient calculation circuit and supplying an instruction for halting a divide operation in response to the determination, by said overflow determining means, of an overflow and a pre-overflow "PO flag" which represents a state of the most significant bit of a quotient found by the quotient calculation circuit, said operation control means being connected to said overflow determining means and said quotient calculation circuit being connected to said operation unit.

* * * * *